Aug. 26, 1969  W. F. OLASHAW  3,463,968
MODULAR COMPONENT BUS SYSTEM WITH PASS-THRU INSULATOR
Filed March 14, 1968  3 Sheets-Sheet 1

INVENTOR
WILLIAM F. OLASHAW
BY [signature]
ATTORNEY

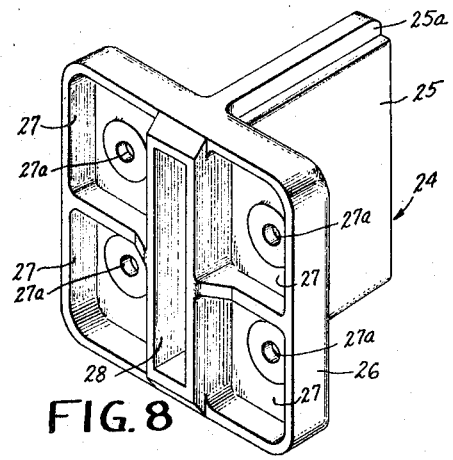
FIG. 8
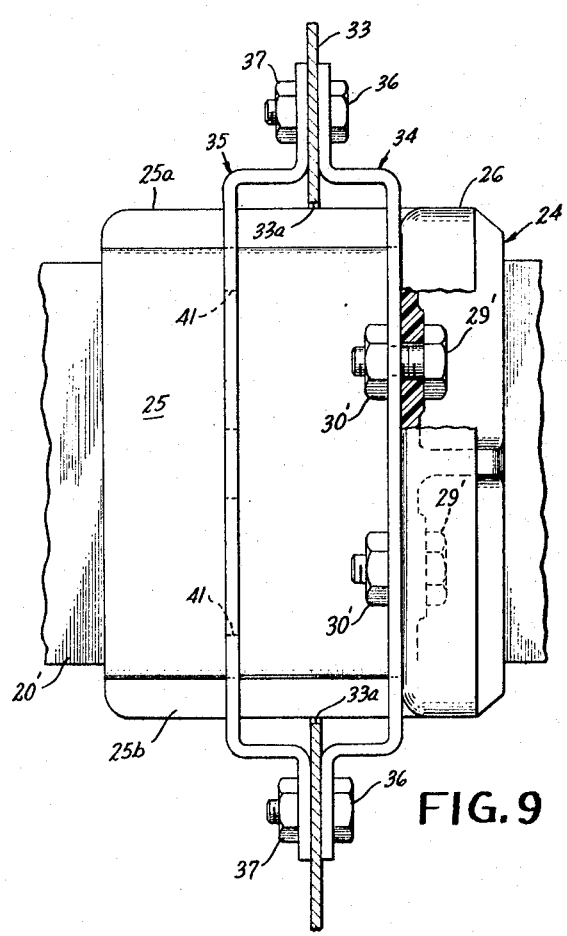
FIG. 9
FIG. 11
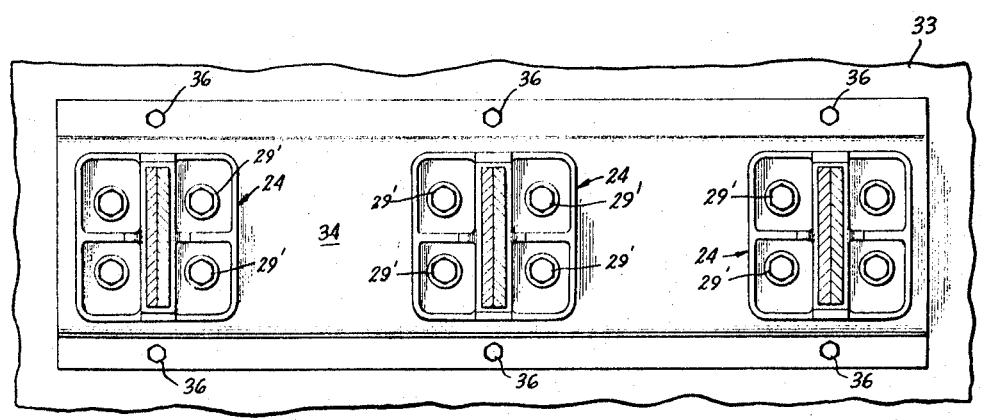
FIG. 10
INVENTOR
WILLIAM F. OLASHAW
BY
ATTORNEY

United States Patent Office 3,463,968
Patented Aug. 26, 1969

3,463,968
MODULAR COMPONENT BUS SYSTEM WITH PASS-THRU INSULATOR
William F. Olashaw, Plainville, Conn., assignor to General Electric Company, a corporation of New York
Filed Mar. 14, 1968, Ser. No. 713,062
Int. Cl. H02b 1/08, 1/20; H02g 5/00
U.S. Cl. 317—120                                6 Claims

ABSTRACT OF THE DISCLOSURE

A modular component bus system for a switchboard includes "pass-thru" insulators which allow adapter straps which interconnect the terminals of the devices housed in the switchboard with vertical bus bars arranged in sets or tiers in the switchboard, to pass thru intervening tiers to the vertical bus bars requiring connection, without offsetting.

BACKGROUND OF THE INVENTION

Field of the invention

My invention relates to electrical switchboards, and more particularly to bus bar arrangements in electrical switchboards of the power type comprising one or more metallic cubicles each containing electrical control devices at the front portion thereof and bussing structure interconnecting the terminals of such devices at the rear thereof to each other and to other incoming and outgoing conductors.

Description of the prior art

In accordance with the prior art, switchboards of the type referred to commonly include main power supply bus bars to which the line connections of the control devices must be connected and load or output terminals connected to outgoing conductors or to other devices within the switchboard, such load terminal connections being accessible only from the back of the switchboard. Since numerous incoming and outgoing conductors are required and since all connections are made from the rear of the switchboard, several basic problems are presented. These problems include minimizing the danger involved in installation and connection of such switchboard, providing adequate physical support for the conductors, including bracing against high magnetic forces created by a possible short-circuit condition, and facilitating the installation and replacement of electrical control devices.

In addition, in accordance with this construction, the particular bus bars required for any given installation must be specially constructed, bent, drilled, etc. Thus, each of such switchboards must be "custom-built." This requires substantial time and expense. Also, since the bussing provided for each of such switchboards is different, it is necessary to calculate the electrical and mechanical characteristics, such as strength, short-circuit resistance, heat dissipation, etc. individually for each of such switchboards. This contributes substantially to the cost of construction of such switchboards, and also increases the possibility of error and the probability of possible malfunctioning or failure.

In my prior Patent 3,39,291 issued Oct. 24, 1967, which is assigned to the same assignee as the present invention, I have illustrated a form of switchboard construction which utilizes largely "standardized" prefabricated parts thereby alleviating many of the aforesaid problems inherent in prior art types of switchboard construction. The present invention is directed to a further improvement in the art of switchboard construction of this type whereby the bussing arrangement is further simplified and made more flexible and whereby the need for offsetting or making intermediate bends in certain bars is eliminated.

OBJECTS OF THE INVENTION

It is an object of the present invention to provide an electrical switchboard of the type referred to which includes a bus system capable of accepting essentially all devices and circuits with a minimum amount of material and parts.

It is a further object of the present invention to provide an electrical switchboard of the type referred to which utilizes a bus system formed in an essentially constant arrangement and having predetermined dimension thereby permitting the repetitive utilization of bus systems having known mechanical and electrical characteristics.

A still further object of the present invention is to provide an electrical switchboard of the type referred to which includes a bus system in which the material content thereof has been reduced by virtue of the fact that the connecting straps are able to "pass-thru" the vertical bus instead of around it.

Another object of the present invention is to provide an electrical switchboard of the type referred to which includes a bus system that provides increased physical support and insulation for the bus bars including bracing against high magnetic forces created by a possible short-circuit condition while still permitting easy installation of the bus system in the switchboard.

Yet another object of the present invention is to provide an electrical switchboard of the type referred to including a bus system which is reliable in operation, simple in construction, and relatively inexpensive to manufacture.

SUMMARY OF THE INVENTION

In accordance with the present invention there is provided an electric switchboard including a generally rectangular cubicle having generally planar front and back walls, opposed side walls, and top and bottom walls. A plurality of electrical control devices each having a plurality of terminals projecting therefrom are supported in the cubicle adjacent the front wall thereof. A first group of electrical conductors are supported in the cubicle and extend in a direction substantially parallel to the plane of the front wall of the cubicle in the space between the electrical devices and the back wall of the cubicle. A second group of electrical conductors are supported in the cubicle and extend in a plane substantially parallel to that of the first group of electrical conductors in the space between the electrical devices and the first group of electrical conductors. Each of the electrical conductors comprises a pair of bus bars each having a right-angle cross-section and comprising first and second lengthwise portions extending substantially perpendicular to each other. The individual bus bars of each pair thereof are supported in juxtaposed relation with one of the lengthwise portions of each of the bus bars spaced slightly from the parallel to one of the lengthwise portions of the other of the bus bars. First and second groups of adapter straps of conductive material are supported in the cubicle and extend substantially perpendicular to the planes of the electrical conductors. The adapter straps of the first and second group thereof each have one end connected to the terminals of the electrical control devices. The other ends of some of the first group of adapter straps are connected to respective ones of the first group of electrical conductors, and the other ends of the second group of adapter straps are connected to respective ones of the second group of electrical conductors whereby the electrical control devices have some of their terminals connected to the first group of electrical conductors and some to the second group of electrical conductors. At least some of the first group of adapter straps pass between the slightly spaced individual bus bars of respective pairs of bus bars of the second group of electrical conductors. Means is provided for securing to the individual slightly spaced bus bars of the second group of electrical conductors intermediate portions of those adapter straps which pass therebetween. Insulating means is also provided for insulating the said intermediate portions of the adapter straps from the individual slightly spaced bus bars to which they are secured by said securing means.

The invention will be more fully understood from the following detailed description and its scope will be pointed out in the appended claims.

BRIEF DESCRIPTION OF THE DRAWINGS

In the drawings:

FIGURE 8 is a perspective view of the pass-thru insulator used in the bussing structures of the embodiments of the invention illustrated in FIGURES 3 and 6;

FIGURE 9 is a side elevation view on an enlarged scale of a portion of the bussing structure utilized in the form of the invention illustrated in FIGURE 6;

FIGURE 10 is an end view of the portion of the bussing structure illustrated in FIGURE 9; and FIGURE 11 is an end view of a portion of the interior structure of the switchboard with which the pass-thru insulator of FIGURE 8 cooperates in the form of the invention illustrated in FIGURE 6.

DESCRIPTION OF THE PREFERRED EMBODIMENT

Figure 1:
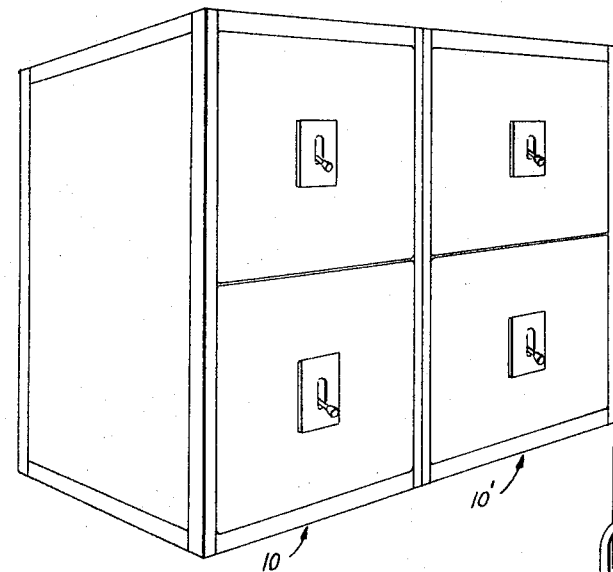
FIGURE 1 is a perspective view of an electrical switchboard of the type incorporating the subject invention.

The invention is shown in the drawings as incorporated in an electric switchboard shown generally in FIGURE 1, and comprising two vertical sections or cubicles 10 and 10'.

Figure 3:
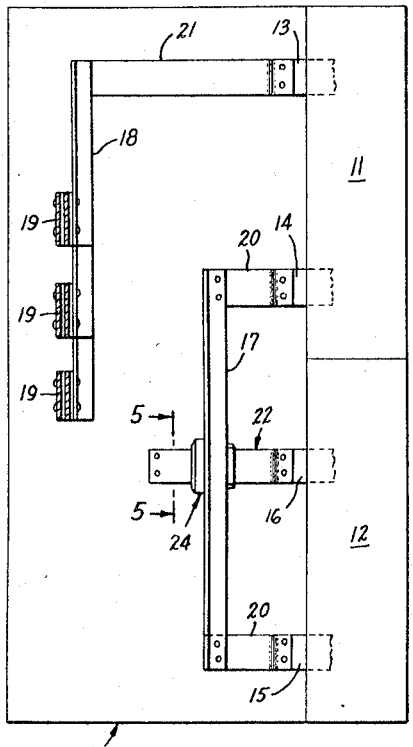
FIGURE 3 is a side elevation view of an electrical switchboard section constructed in accordance with the invention, the side of the cubicle nearest the observer being removed.

Referring first to the structure of cubicle 10 as shown in FIGURE 3, the invention is shown as incorporated in the electrical switchboard cubicle 10 which includes a first electrical device 11 such as a current-transformer, and a second electrical device 12 such as a main circuit breaker supported at the front portion thereof. The current transformer 11 includes a first set of three terminals 13 and a second set of three terminals 14 projecting from the rear portion thereof. The main circuit breaker 12 also includes at the rear thereof a first set of three terminals 15 and a second set of three terminals 16. In accordance with the invention, a plurality of tiers of vertical bus bars 17 and 18 respectively are also provided. Each of the tiers 17 and 18 comprises three pairs of right-angle cross-section bus bars as shown particularly in FIGURE 4. A set of three horizontally extending bus bars 19 are also provided at the rear portion of the cubicle 10.

In accordance with the invention, the first tier of vertically extending bus bars 17 is positioned at a predetermined distance from the back wall of the cubicle. Likewise, the second tier of vertically extending bus bars 18 is supported at a second distance from the back wall of the cubicle, behind the first tier or group of bus bars.

A plurality of adapter straps 20 are provided for connecting the terminals 14 and 15 of the devices 11 and 12 to the first group 17 of bus bars, and different adapter straps 21 are provided connecting the terminals 13 to the second group 18 of vertically extending bus bars. There is also provided a third set of adapter straps 22 which in connecting the terminals 16 with incoming conductors (not shown) pass through the bus bars 17 of the first tier or group in a manner to be more fully set forth hereinbelow.

In use, incoming power supply conductors (not shown) are connected through the adapter straps 22 to the terminals 16 of the main circuit breaker 12. The power flow extends from the terminals 16 through the main circuit breaker 12 to the terminals 15, through the vertically extending bus bars 17 to the terminals 14 of the current transformer compartment. Then the power flows through the current transformer 11 to the terminals 13 through the adapter straps 21 to the second group of vertically exending bus bars 18, and thence to the horizontally extending bus bars 19, which are rigidly supported in the cubicle 10 by suitable insulating means such as the standoff insulators 23 illustrated in FIGURE 4.

The vertically extending bus bars 17 are mechanically supported with relation to each other by the terminals 14 and 15 and further by means of generally T-shaped pass-thru insulators 24. The vertically extending bus bars 18 are supported by their connections to the horizontal bus bars 19 and the adapter straps 21.

Since the vertically extending bus bars of the first tier 17 are at a predetermined location, at a distance from the back wall of the cubicle 10, and since the vertically extending bus bars 18 are at a predetermined distance from the back wall of the cubicle, and since their spacing is maintained constant, the mechanical and electrical characteristics of the bussing structure can be readily predicted.

Referring now to FIGURE 8, in accordance with the invention, a special insulator is provided, having a generally T-shaped configuration formed by a hollow stem portion 25. The hollow stem portion 25 is provided with external narrow ribs 25a, 25b preferably of solid construction extending along the top and bottom respectively of the hollow stem portion 25 for a purpose to be described hereinafter. The base 26 has formed therein four pockets 27, each of which is provided with an opening 27a for the purpose of receiving a mounting bolt 29. In addition, the base 26 is provided with a centrally located slot 28 having a height and a width corresponding to the inside dimensions of the longitudinally extending hollow stem portion 25.

Figure 4:
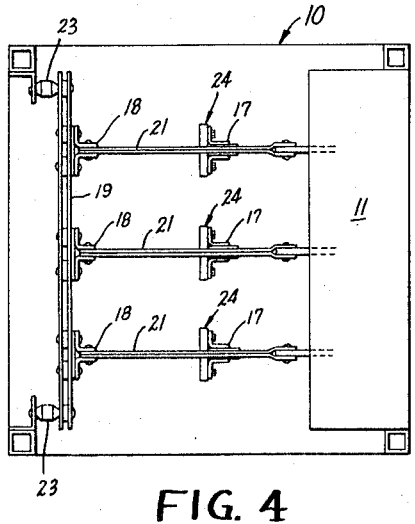
FIGURE 4 is a top plan view of the switchboard of FIGURE 3.

As shown in the embodiment of the invention illustrated in FIGURES 3 and 4, the T-shaped insulators 24 provide a means of passing the adapter straps 22 directly through the first tier of vertically extending bus bars 17 to reach the incoming conductors (not shown) to which the adapter straps 22 are intended to be connected, and may therefore be referred to as "pass-thru" insulators.

Figure 5:
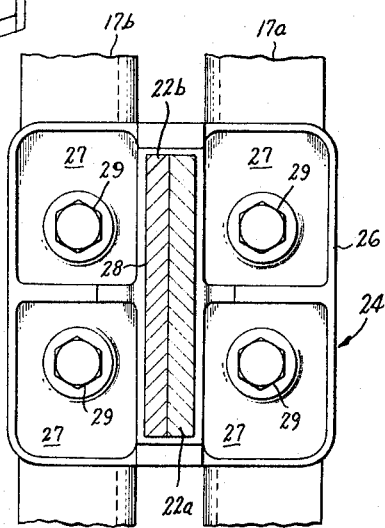
FIGURE 5 is a sectional view of a portion of the bussing structure of FIGURE 3, taken substantially on the section indicated by the line 5—5 of FIGURE 3.
Figure 2:
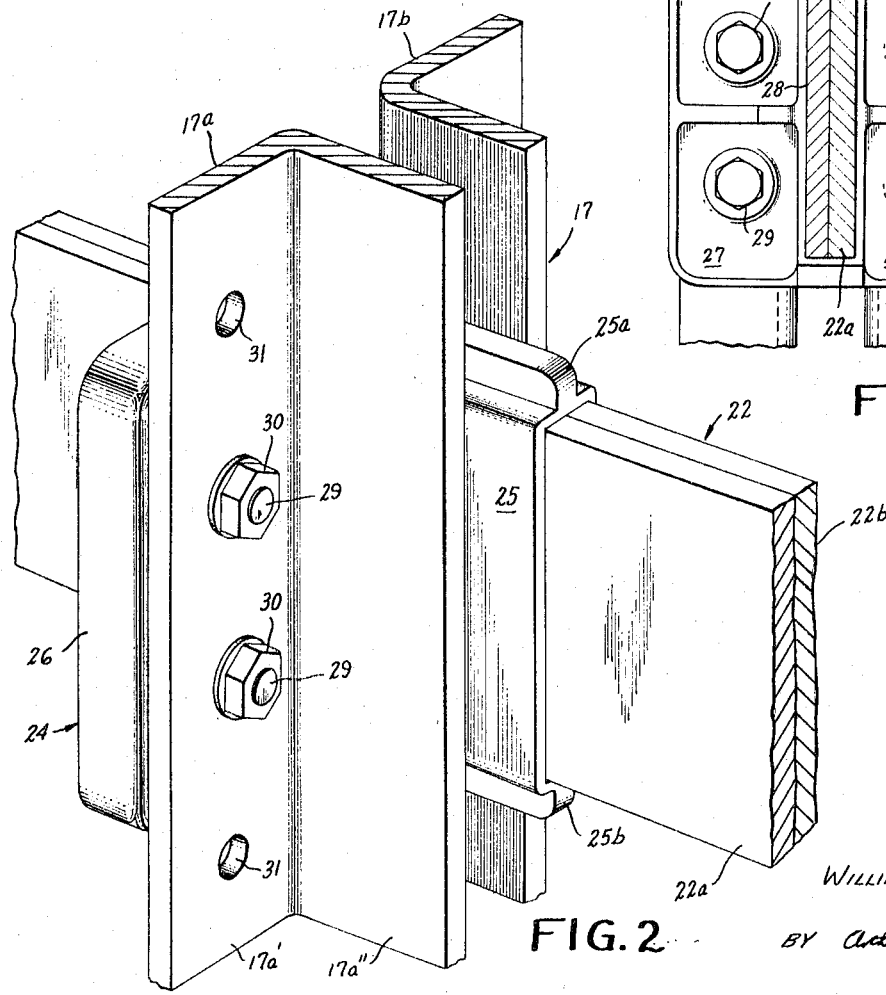
FIGURE 2 is a perspective view on an enlarged scale of a portion of the bussing structure utilized in the form of the invention illustrated in FIGURE 3.

Referring to FIGURES 2 and 5, the adapter strap 22, which may comprise either a pair of individual bus bars 22a and 22b as shown in the drawings or a single solid bus bar (not shown), extends through the longitudinally extending hollow stem portion 25 and the centrally located slot 28 of the pass-thru insulator 24. The base 26 of the insulator 24 is suitably secured at the desired location to the vertically extending bus bar 17 by means of bolts 29 and nuts 30, or other suitable means, such that the hollow stem portion 25 of insulator 24 is trapped between the individual right-angle bus bars 17a and 17b which together comprise one vertically extending bus bar 17. The hollow stem portion 25 thereby provides an insulation barrier between the adapter strap 22 and the bus bar 17. The bolts 29 are received in the openings 27a provided therefor in the base 26 and in selected ones of the plurality of openings 31 punched preferably on modular centers in the individual bus bars 17a and 17b.

Inasmuch as the pass-thru insulators 24 enable a straight-line connection to be made between the adapter straps 22 and the incoming conductors rather than requiring an off-set by-passing arrangement, there is a considerable savings derived both in cost of materials as well as time needed for installation over that required for example in the switchboard construction illustrated in my previously referred to prior Patent 3,349,291. This construction utilizing pass-thru insulators permits further standardization of parts inasmuch as only straight-length straps are required, with accompanying well-known benefits to be derived therefrom insofar as manufacture, warehouse stocking, and distribution of parts is concerned. More important, however, the pass-thru insulators 24 provide added support within the switchboard cubicle 10 for the adapter straps 22 and the vertically extending bus bars 17. Such added support is obtained without sacrificing any of the other beneficial features of this type of switchboard construction, and is desirable not only because it increases the basic structural strength of the switchboard cubicle 10, but also because it provides additional bracing against the high magnetic forces created by a possible short-circuit condition.

Figure 7:
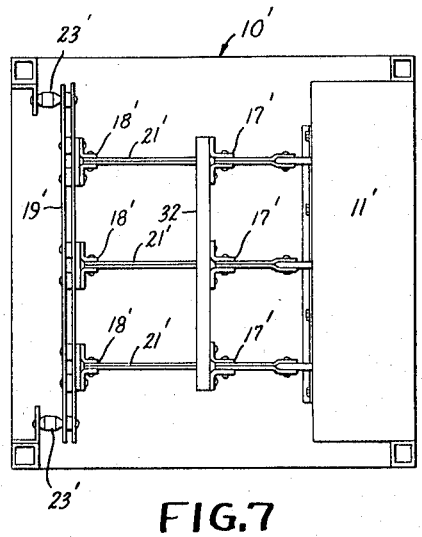
FIGURE 7 is a top plan view of the switchboard of FIGURE 6.
Figure 6:
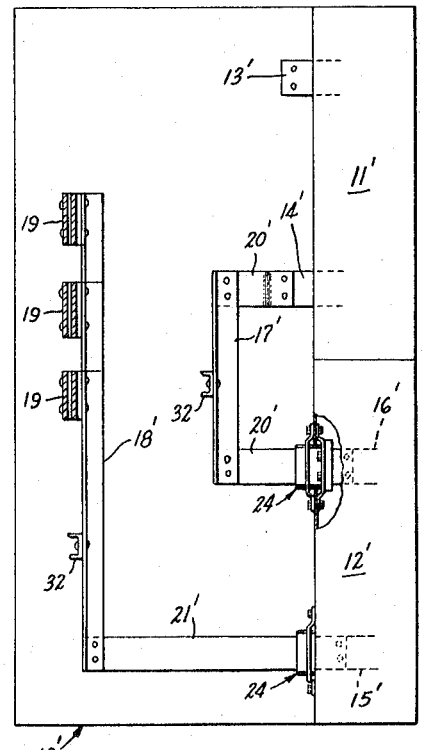
FIGURE 6 is a side elevation view similar to that of FIGURE 3 illustrating another embodiment of the invention.

In the embodiment illustrated in FIGURES 6 and 7, incoming power supply conductors, not shown, are connected to the terminals 13' of the current transformer compartment 11'. The power flow path extends from the terminals 13' through the current transformer compartment 11' to the terminals 14', through the adapter straps 20' to the vertical bus bars 17', and through the other adapter straps 20' to the terminals 16' of the main circuit breaker (not shown) housed in the compartment 12'. The power then flows through the main circuit breaker to the terminals 15', through the adapter straps 21' to the verically extending bus bars 18', and thence to the horizontally extending bus bars 19', which are rigidly supported in the cubicle 10' by suitable insulating means such as stand-off insulators 23' of FIGURE 7.

The vertically extending bus bars 17' are mechanically supported with relation to each other by the terminals 14' and 16' and further by means of a generally channel-shaped transverse insulating supporting brace 32. The vertically extending bus bars 18' are supported by their connections to the horizontal bus bars 19' and the adapter straps 21' and are further supported against transverse movement by a generally channel-shaped transverse insulating brace 32.

In this embodiment the adapter straps 20' connecting the terminals 14' and 16' to the vertical bus 17' are identical to the adapter straps 20 of FIGURE 3. The adapter straps 21' of FIGURE 6, connecting the terminals 15' to the vertical bus bars 18' are also identical to the adapter straps 21 of FIGURE 3.

As shown in the drawings and as previously referred to in connection with the embodiment of the invention illustrated in FIGURES 3 and 4, the vertical bus bars 17 and 18 of the FIGURE 3 form as well as the vertical bus bars 17' and 18' of the FIGURE 6 form comprise bars having a right-angle cross-section. Each such bus bar therefore comprises two legnthwise portions such as 17a' and 17a", see FIGURE 2, each of which is provided with a lengthwise row of equally-spaced pre-punched holes 31 therein.

As shown in the embodiment of the invention illustrated in FIGURES 6 and 7, pass-thru insulators 24 are also utilized, in accordance with the invention, in installations of the type wherein the adapter straps 20' and 21' extend into the compartment which houses the electrical device to make connection therein with the terminals 15' and 16' of the device. Referring now more particularly to FIGURES 9, 10, and 11 of the drawings the rear wall 33 of the compartment housing the device 12' is provided with a horizontally extending opening 33a having a height slightly larger than that of the pass-thru insulator 24 and having a length slightly longer than the total distance between any set of three terminals 15' and 16' of the device 12'.

Referring particularly to FIGURES 6 and 9, a pair of generally C-shaped flanged members designated by reference numerals 34 and 35, respectively, are positioned on either side of the compartment back wall 33 in juxtaposed relation to each of the openings 33a in the back wall 33. The C-shaped members 34 and 35 are preferably secured in place by means of a plurality of bolts 36 and nuts 37, suitable openings (not shown) being provided in the compartment back wall 33 for the purpose of receiving the bolts 36. Each of the C-shaped members 34 and 35, in addition to being provided with a plurality of openings 38 which in use receive the bolts 36, is also provided with a plurality of slotted openings 39. Ordinarily, one such opening 39 is provided for each of the terminals, i.e., 15' and 16' of the device 12'. Thus, for example in the embodiment of the invention illustrated in FIGURES 6 and 10, each of the C-shaped members 34, 35 is provided with three such slotted openings 39.

Dimension-wise each of the slotted openings 39 corresponds substantially to the outer dimensions of the hollow stem portion 25 of the pass-thru insulator 24. In addition the top and bottom of each of the slotted openings 39 as best seen with reference to FIGURE 11 is narrower than the main portion of the opening 39 for the purpose of receiving the narrow ribs 25a and 25b of the hollow stem portion 25. The narrow top and bottom portions of the opening 39 serve not only as a guide means for ensuring the proper positioning of the pass-thru insulator 24 in the C-shaped flange members 34 and 35 but also act as a form of locking means to hold the pass-thru insulator in place until the latter is secured to the C-shaped flange member 34 by suitable means.

In use, the C-shaped members 34 and 35 are secured in place by the bolts 36 and nuts 37. The pass-thru insulators 24 are inserted in the openings 39 and are secured in place by means of the bolts 29' which are inserted through the openings 27a in the pass-thru insulators 24 and the openings 40 provided therefor in the C-shaped flange member 34. By use of a suitable tool inserted in the openings 41 which are made extra large for this purpose, nuts 30' may be positioned on the bolts 29'. As shown in FIGURE 11, four such bolts 29' are preferably employed to mount the pass-thru insulators to the C-shaped flange member 34. Then the adapter straps 20' and 21' may be inserted into corresponding ones of the pass-thru insulators 24 such that the adapter straps extend outwardly on each side of the pass-thru insulators in the manner illustrated in FIGURE 6.

Although it would be possible in certain installations to eliminate the C-shaped flange member 35, it has been found desirable from the standpoint of the added strength which the C-shaped member 35 gives to the back wall 33 when used in conjunction with the C-shaped flange member 34 to utilize both C-shaped flange members 34 and 35 in all installations requiring a bussing arrangement of the type illustrated in FIGURES 6 and 7.

As with the embodiment of the invention depicted in FIGURES 3 and 4, the pass-thru insulator 24 of FIGURES 6 and 7 provides additional strength to the structure of the switchboard cubicle 10' by virtue of the fact that the horizontally extending adapter straps 20' and 21' are each further braced against for example the high magnetic forces which may be created as a result of a possible short-circuit condition. In addition and of particular importance in the embodiment of the invention illustrated in FIGURES 6 and 7, the pass-thru insulators 24 provide a means of adequately insulating the adapter straps 20' and 21' from the compartment back wall 33 through which the adapter straps extend in making connection with the respective vertically extending bus bars.

While the invention has been shown in several embodiments, it will be apparent that many other modifications thereof may be made, and I therefore intend by the appended claims to cover all such modifications as fall within the true spirit and scope of the invention.

What I claim as new and desire to secure by Letters Patent of the United States is:

1. A prefabricated electrical switchboard comprising:
   (a) a generally rectangular cubicle having generally planar front and back walls;
   (b) at least one electrical device supported in said cubicle adjacent said front wall of said cubicle, said electrical device having at least one first terminal and one second terminal projecting within said cubicle from the back of said electrical device;
   (c) at least one electrical conductor supported in said cubicle in the space between said electrical device and said back wall of said cubicle, and extending in a direction substantially parallel to the planes of said front and back walls;
   (d) said electrical conductor comprising a pair of bus bars, said bus bars including at least portions thereof disposed in closely-spaced parallel relation to each other;
   (e) at least one first adapter strap of conductive material supported within said cubicle and extending in a direction substantially perpendicular to said planes of said front and back walls, said first adapter strap having one end connected to said first terminal of said electrical device and the other end connected to said electrical conductor;
   (f) at least one second adapter strap of conductive material supported within said cubicle and extending in a direction substantially perpendicular to said planes of said front and back walls, said second adapter strap having one end connected to said second terminal of said electrical device and the other end passing between said pair of bus bars of said electrical conductor;
   (g) an insulating member having a longitudinally extending hollow stem portion, said hollow stem portion being interposed between said pair of bus bars in perpendicular relation to said closely-spaced portions of said pair of bus bars;
   (h) said second adapter strap having an intermediate portion, said intermediate portion extending through said hollow stem portion of said insulating member and thereby being insulated from said closely-spaced portions of said pair of bus bars; and
   (i) means securing said insulating member to each of said closely-spaced portions of said pair of bus bars whereby said second adapter strap is held in fixed position relative to said electrical conductor.

2. A prefabricated electrical switchboard comprising:
   (a) a generally rectangular cubicle having generally planar front and back walls;
   (b) at least one electrical device supported in said cubicle adjacent said front wall of said cubicle, said electrical device having at least one first terminal and one second terminal projecting within said cubicle from the back of said electrical device;
   (c) at least one electrical conductor supported in said cubicle in the space between said electrical device and said back wall of said cubicle and extending in a direction substantially parallel to the planes of said front and back walls;
   (d) said electrical conductor comprising at least one bus bar having a right-angle cross-section and comprising first and second lengthwise portions extending substantially perpendicular to each other;
   (e) at least one first adapter strap of conductive material supported within said cubicle and extending in a direction substantially perpendicular to said planes of said front and back walls, said first adapter strap having one end connected to said first terminal of said electrical device and the other end connected to said electrical conductor;
   (f) at least one second adapted strap of conductive material supported within said cubicle and extending in a direction substantially perpendicular to said planes of said front and back walls, said second adapter strap having one end connected to said second terminal of said electrical device and the other end passing in juxtaposed relation to said one bus bar;
   (g) an insulating member having a longitudinally extending hollow stem portion and a base portion extending at right angles to said hollow stem portion;
   (h) means securing said base portion of said insulating member to one of said lengthwise portions of said bus bar whereby said hollow stem portion of said insulating member is in juxtaposed relation to the other of said lengthwise portions of said bus bar; and
   (i) said second adapter strap having an intermediate portion, said intermediate portion extending through said hollow stem portion of said insulating member whereby said second adapter strap is insulated from said lengthwise portions of said bus bar and is held in fixed position relative to said electrical conductor.

3. A prefabricated electrical switchboard as set forth in claim 2 wherein:
   (a) said electrical conductor comprises a pair of bus bars each having a right-angle cross-section and comprising first and second legnthwise portions extending substantially perpendicular to each other, said pair of bus bars being supported in slightly spaced relation with one of said lengthwise portions of each of said bus bars closely adjacent and parallel to one of said lengthwise portions of the other of said bus bars;
   (b) said other end of said second adapter strap passes between said pair of bus bars of said electrical conductor; and
   (c) said securing means secures said base portion of said insulating member to one of said lengthwise portions of each of said bus bars.

4. A prefabricated electrical switchboard comprising:
   (a) a generally rectangular cubicle having generally planar front and back walls;
   (b) at least a pair of electrical devices supported in said cubicle adjacent said front wall of said cubicle, said pair of electrical devices each having at least one first terminal and one second terminal projecting within said cubicle from the back thereof;
   (c) at least one first electrical conductor supported in said cubicle in the space between said pair of electrical devices and said back wall of said cubicle, and extending in a direction substantially parallel to the planes of said front and back walls;
   (d) at least one second electrical conductor supported in said cubicle in the space between said first electrical conductor and said pair of electrical devices and extending in a direction substantially parallel to the planes of said front and back walls;
   (e) each of said first and second electrical conductors comprising a pair of bus bars, said bus bars including at least portions thereof disposed in closely-spaced parallel relation to each other;
   (f) at least one first adapter strap of conductive material supported within said cubicle and extending in a direction substantially perpendicular to said planes of said front and back walls, said first adapter strap having one end connected to said first terminal of one of said pair of electrical devices and the other end connected to said first electrical conductor;
   (g) at least one second adapter strap of conductive material supported within said cubicle and extending in a direction substantially perpendicular to said planes of said front and back walls, said second adapter strap having one end connected to said second terminal of said one of said pair of electrical devices and the other end connected to said second electrical conductor;

(h) at least one third adapter strap of conductive material supported within said cubicle and extending in a direction substantially perpendicular to said planes of said front and back walls, said third adapter strap having one end connected to said first terminal of the other of said pair of electrical devices and the other end connected to said second electrical conductor;

(i) at least one fourth adapter strap of conductive material supported within said cubicle and extending in a direction substantially perpendicular to said planes of said front and back walls, said fourth adapter strap having one end connected to said second terminal of said other of said pair of electrical devices and the other end passing between said pair of bus bars of said second electrical conductor;

(j) an insulating member having a longitudinally extending hollow stem portion, said hollow stem portion being interposed between said pair of bus bars of said second electrical conductor in perpendicular relation to said closely-spaced portions of said pair of bus bars of said second electrical conductor;

(k) said fourth adapter strap having an intermediate portion, said intermediate portion extending through said hollow stem portion of said insulating member and thereby being insulated from said closely-spaced portions of said pair of bus bars of said second electrical conductor; and (l) means securing said insulating member to each of said closely-spaced portions of said pair of bus bars of said electrical conductor whereby said fourth adapter strap is held in fixed position relative to said second electrical conductor.

5. A prefabricated electrical switchboard comprising:
(a) a generally rectangular cubicle having generally planar front and back walls;
(b) at least a pair of electrical devices supported in said cubicle adjacent said front wall of said cubicle, said pair of electrical devices each having at least one first terminal and one second terminal projecting within said cubicle from the back thereof;
(c) at least one first electrical conductor supported in said cubicle in the space between said pair of electrical devices and said back wall of said cubicle and extending in a direction substantially parallel to the planes of said front and back walls;
(e) each of said first and second electrical conductors comprising a pair of bus bars each having a right-angle cross-section and comprising first and second lengthwise portions extending substantially perpendicular to each other, each of said pairs of bus bars being supported in slightly spaced relation with one of said lengthwise portions of one of said bus bars of each of said pairs thereof closely adjacent and parallel to one of said lengthwise portions of the other of said bus bars of each of said pairs thereof;
(f) at least one first adapter strap of conductive material supported within said cubicle and extending in a direction substantially perpendicular to said planes of said front and back walls, said first adapter strap having one end connected to said first terminal of one of said pair of electrical devices and the other end connected to said first electrical conductor;
(g) at least one second adapter strap of conductive material supported within said cubicle and extending in a direction substantially perpendicular to said planes of said front and back walls, said second adapter strap having one end connected to said second terminal of said one of said pair of electrical devices and the other end connected to said second electrical conductor;

(h) at least one third adapter strap of conductive material supported within said cubicle and extending in a direction substantially perpendicular to said planes of said front and back walls, said third adapter strap having one end connected to said first terminal of the other of said pair of electrical devices and the other end connected to said second electrical conductor;

(i) at least one fourth adapter strap of conductive material supported within said cubicle and extending in a direction substantially perpendicular to said planes of said front and back walls, said fourth adapter strap having one end connected to said second terminal of said other of said pair of electrical devices and the other end of said fourth adapter strap passing between said pair of bus bars of said second electrical conductor;

(j) an insulating member having a longitudinally extending hollow stem portion and a base portion extending at right angles to said hollow stem portion;

(k) means securing said base portion of said insulating member to one of said lengthwise portions of each of said pair of bus bars of said second electrical conductor whereby said hollow stem portion of said insulating member extends between said pair of bus bars of said second electrical conductor and in juxtaposed relation to the other of said lengthwise portions of each of said pair of bus bars of said second electrical conductor; and (l) said fourth adapter strap having an intermediate portion, said intermediate portion extending through said hollow stem portion of said insulating member whereby said fourth adapter strap is insulated from said lengthwise portions of each of said pair of bus bars of said second electrical conductor and is held in fixed position relative to said second electrical conductor.

6. A prefabricated electrical switchboard comprising:
(a) a generally rectangular cubicle having generally planar front and back walls;
(b) at least one compartment formed along a portion of said front wall of said cubicle, and having a back wall;
(c) at least one electrical device supported in said compartment adjacent said front wall of said cubicle, said electrical device having at least one first terminal and one second terminal projecting within said compartment from the back of said electrical device;
(d) at least one electrical conductor supported in said cubicle in the space between said compartment and said back wall of said cubicle and extending in a direction substantially parallel to the planes of said front and back walls of said cubicle;
(e) at least one first adapter strap of conductive material supported within said cubicle and extending in a direction substantially perpendicular to said planes of said front and back walls of said cubicle, said first adapter strap having one end connected to said electrical conductor and the other end of said first adapter strap extending through said back wall of said compartment and connected within said compartment to said first terminal of said electrical device;
(f) at least one second adapter strap of conductive material supported within said cubicle and extending in a direction substantially perpendicular to said planes of said front and back walls of said cubicle, said second adapter strap having one end extending through said back wall of said compartment and connected within said compartment to said second terminal of said electrical device;
(g) a first insulating member having a longitudinally extending hollow stem portion and a base portion extending at right angles to said hollow stem portion;

(h) first means supporting said base portion of said first insulating member on said back wall of said compartment with said hollow stem portion of said first insulating member projecting through said back wall of said compartment;

(i) said first adapter strap having an intermediate portion, said intermediate portion of said first adapter strap extending through said hollow stem portion of said first insulator member whereby said first adapter strap is insulated from said back wall of said compartment and is held in a predetermined position relative to said back wall of said compartment;

(j) a second insulating member having a longitudinally extending hollow stem portion and a base portion extending at right angles to said hollow stem portion;

(k) second means supporting said base portion of said second insulating member on said back wall of said compartment with said hollow stem portion of said second insulating member projecting through said back wall of said compartment; and (l) said second adapter strap having an intermediate portion, said intermediate portion of said second adapter strap extending through said hollow stem portion of said second insulator member whereby said second adapter strap is insulated from said back wall of said compartment and is held in a predetermined position relative to said back wall of said compartment.

References Cited

UNITED STATES PATENTS 3,349,291  10/1967  Olashaw _____ 317—120

LARAMIE E. ASKIN, Primary Examiner

G. P. TOLIN, Assistant Examiner

U.S. Cl. X.R.

174—72